United States Patent
Matsushita et al.

(10) Patent No.: US 8,515,177 B2
(45) Date of Patent: Aug. 20, 2013

(54) IMAGE PROCESSING APPARATUS, IMAGE PROCESSING METHOD, AND PROGRAM

(75) Inventors: Masahiro Matsushita, Yokohama (JP);
Hirotaka Shiiyama, Yokohama (JP);
Hidetomo Sohma, Yokohama (JP);
Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 12/552,908

(22) Filed: Sep. 2, 2009

(65) Prior Publication Data

US 2010/0054593 A1    Mar. 4, 2010

(30) Foreign Application Priority Data

Sep. 4, 2008  (JP) ................. 2008-226990

(51) Int. Cl.
*G06K 9/46*  (2006.01)
(52) U.S. Cl.
USPC ......................................... 382/190; 382/201
(58) Field of Classification Search
None
See application file for complete search history.

(56) References Cited

U.S. PATENT DOCUMENTS

| | | | |
|---|---|---|---|
| 6,975,755 B1 * | 12/2005 | Baumberg | 382/154 |
| 2006/0204103 A1 * | 9/2006 | Mita et al. | 382/190 |
| 2006/0274081 A1 | 12/2006 | Matsushita | |
| 2007/0292019 A1 * | 12/2007 | Terakawa | 382/159 |
| 2008/0013836 A1 * | 1/2008 | Nakamura et al. | 382/209 |

FOREIGN PATENT DOCUMENTS

| | | |
|---|---|---|
| JP | 9-44665 A | 2/1997 |
| JP | 2004-326693 A | 11/2004 |
| JP | 2006-094000 A | 4/2006 |
| JP | 2007-012024 A | 1/2007 |
| JP | 2007-148819 A | 6/2007 |

OTHER PUBLICATIONS

Terasawa et al., "Error Evaluation of Scale Invariant Local Descriptor and It's Application to Image Indexing," Aug. 1, 2005, pp. 1720-1728, vol. J88-D-II No. 8, Japan.

* cited by examiner

*Primary Examiner* — Jason M Repko
*Assistant Examiner* — David Perlman
(74) *Attorney, Agent, or Firm* — Canon USA Inc. IP Division

(57) ABSTRACT

An image processing apparatus executes smoothing processing (reduction conversion) of an input image to acquire a smoothed image (reduced image), acquires a normalization parameter for normalization from the smoothed image, and normalizes pixel values of the input image based on the normalization parameter.

13 Claims, 14 Drawing Sheets

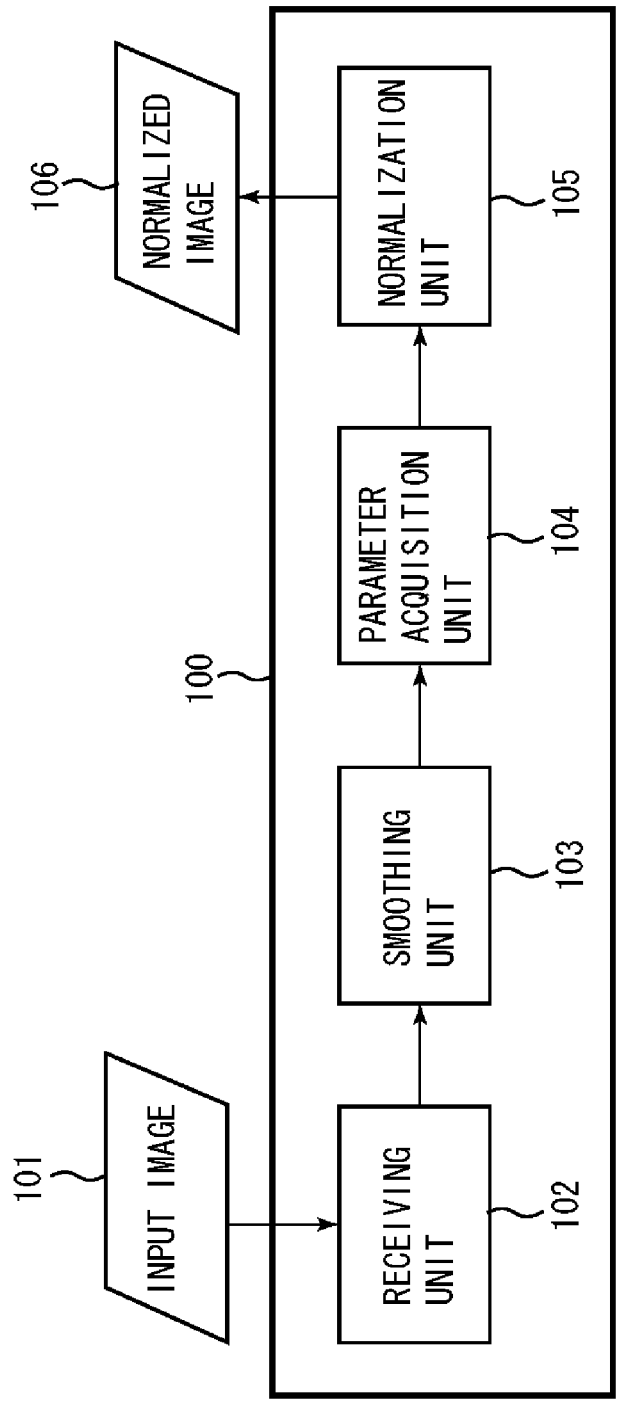

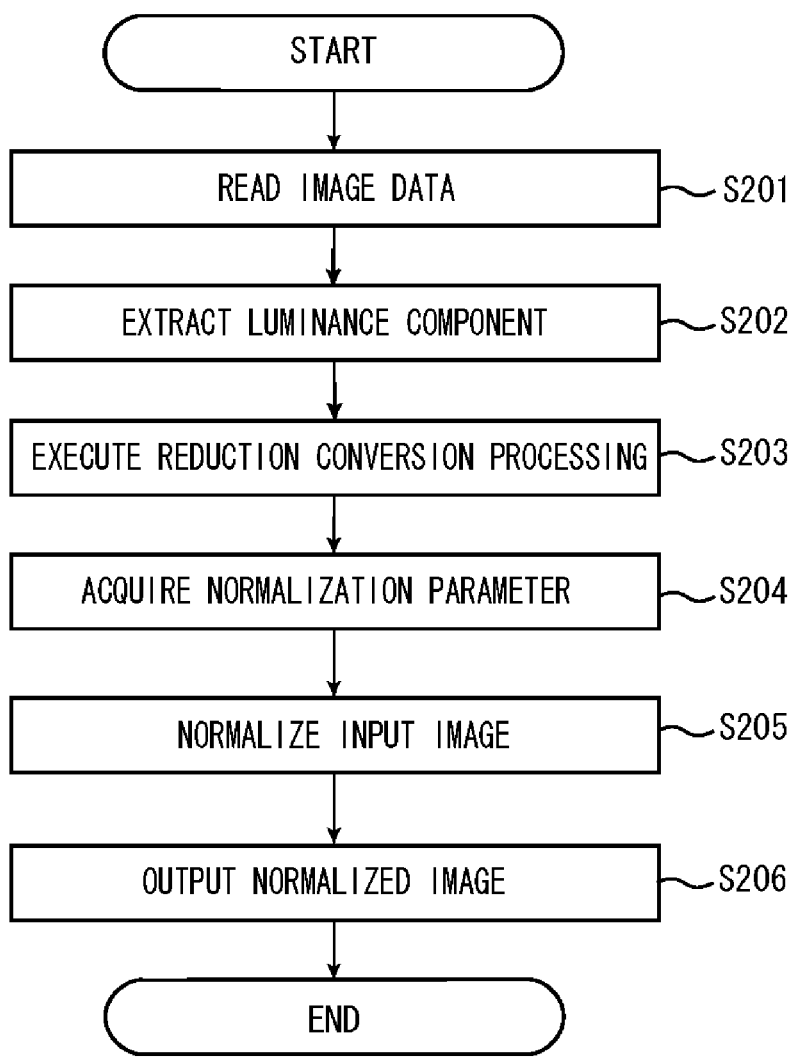

IMAGE PROCESSING APPARATUS, IMAGE PROCESSING METHOD, AND PROGRAM

BACKGROUND OF THE INVENTION

1. Field of the Invention

The present invention relates to an image processing apparatus which executes processing that normalizes an image, an image processing method, and a program.

2. Description of the Related Art

There is a method which searches for a similar image by extracting and comparing feature amounts, such as colors and edges of images, from both of an image serving as a search query (hereinafter referred to as a query image) and an image stored in a database (hereinafter referred to as a stored image).

Conventionally, when an image having a color or image quality changed by printing or scanning is searched for, or conversely, when an image of the original is searched for using an image having a changed color or image quality, normalization has been executed by referring to pixel values of the entire image. For example, as preprocessing for extracting a feature amount from an image, a maximum value and a minimum value of a luminance component have been corrected, or a dynamic range (ratio of the maximum value to the minimum value) of one of color components of an image has been corrected. With such normalization, even an image having a changed color or image quality can been handled similar to an image having no change.

Japanese Patent Application Laid-Open No. 2007-012024 discusses a method which quantizes continuous luminance from white to black and normalize luminance values such that a pixel of each quantized luminance appears in equal proportion in an image.

Further, Japanese Patent Application Laid-Open No. 09-44665 discusses a method which searches for a similar image using a local feature amount of an image. This method selects feature points from each image using a DOG function, determines feature amounts corresponding to the selected points, and compares these feature amounts with each other.

However, in an image having a color or image quality changed by scanning or the like, a dot noise (isolated dot noise or halftone dot noise) irrelevant to a surrounding pixel may often be generated. A pixel containing such a noise may have an extreme value of luminance. Even if a technique discussed in Japanese Patent Application Laid-Open No. 2007-012024 is used, the image may not excellently be normalized.

However, on the other hand, if normalization is executed after a filter for correcting a dot noise is applied to the entire image, this normalization may affect a feature amount which is extracted after normalization has been executed, and may influence search accuracy and recognition accuracy.

Particularly, as a technique discussed in Japanese Patent Application Laid-Open No. 09-44665, when an image is recognized and searched for with a feature amount at a predetermined feature point (hereinafter referred to as a local feature amount) set as a search query, localization of the local feature amount may be lost.

SUMMARY OF THE INVENTION

The present invention is directed to an image processing apparatus that is capable of realizing suitable normalization with a reduced influence from noises when normalizing luminance values or color values of an image, an image processing method, and a program.

According to an aspect of the present invention, an image processing apparatus includes a receiving unit configured to receive an input image, an acquisition unit configured to acquire a reduced image obtained by executing reduction processing of the input image, a parameter acquisition unit configured to acquire a normalization parameter from the reduced image, and a normalization unit configured to normalize pixel values of the input image based on the normalization parameter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a functional block diagram illustrating an image normalization apparatus according to an exemplary embodiment of the present invention.

FIG. 2 is a flowchart illustrating normalization processing according to an exemplary embodiment of the present invention.

DETAILED DESCRIPTION OF THE EMBODIMENTS

Figure 3A:
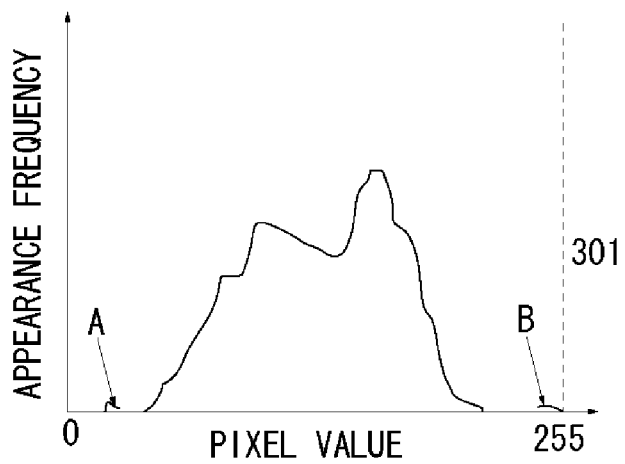
FIGS. 3A to 3C are luminance distribution diagrams illustrating a normalization parameter and normalization processing.

Various exemplary embodiments, features, and aspects of the invention will be described in detail below with reference to the drawings.

FIG. 1 is a functional block diagram illustrating an image normalization apparatus 100, which can serve as an image processing apparatus according to an exemplary embodiment of the present invention. The image normalization apparatus 100 includes a receiving unit 102, a smoothing unit 103, a parameter acquisition unit 104, and a normalization unit 105.

FIG. 2 is a flowchart illustrating image normalization processing by the image normalization apparatus 100. In step S201, the receiving unit 102 executes processing for reading an input image 101 to be normalized.

Next, the smoothing unit 103 executes smoothing processing in steps S202 and S203. In the present exemplary embodiment, since normalization is executed by focusing attention on a luminance value among pixel values of the input image 101, in step S202, the smoothing unit 103 extracts a luminance component. Further, in step S203, the smoothing unit 103 executes reduction conversion to smooth the input image 101. In reduction conversion, for example, when an image is vertically and horizontally reduced to 50%, the smoothing unit 103 outputs an average value of four pixels as one pixel. By executing such reduction conversion, an extreme noise, such as an isolated dot or a halftone dot, is reduced. In the present exemplary embodiment, a reduced image is acquired as a smoothed image.

In step S204, the parameter acquisition unit 104 acquires a normalization parameter for use in normalization of pixel values from the reduced image acquired by reduction conversion. In the present exemplary embodiment, the parameter acquisition unit 104 acquires a minimum luminance value and a maximum luminance value from the reduced image as a normalization parameter. In step S205, the normalization unit 105 corrects a luminance distribution of pixel values of the input image 101 using the normalization parameter to normalize the input image 101. In step S206, the normalization unit 105 outputs the normalized input image 101 as a normalized image 106.

Figure 3B:
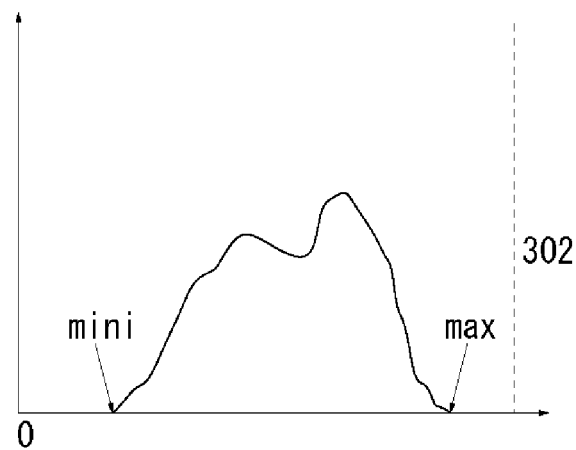
Figure 3C:
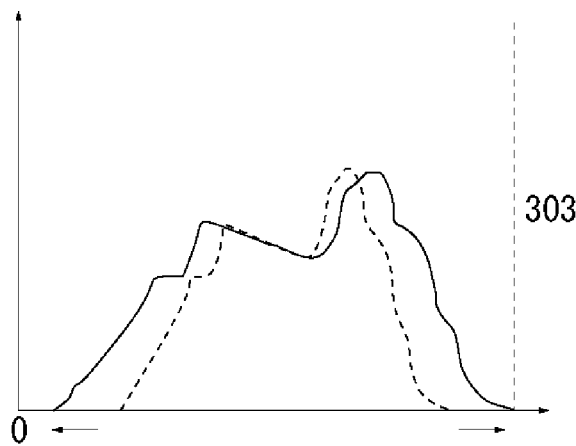

FIGS. 3A to 3C illustrate a distribution of pixel values in an image (histogram and luminance distribution for luminance). The vertical axis indicates an appearance frequency of a pixel with a predetermined pixel value and the horizontal axis indicates the magnitude of a pixel value (luminance value). FIG. 3A illustrates a luminance distribution of the input image 101. FIG. 3B illustrates a luminance distribution of a reduced image obtained by reducing the input image 101. FIG. 3C illustrates a normalized luminance distribution. In the present exemplary embodiment, the pixel value is quantized with 8 bits. Thus, a possible maximum value of the pixel value is "255" (broken lines 301, 302, and 303).

In the example illustrated in FIG. 3A, the input image 101 is a scanned image. A pixel containing a noise caused by electric scan is generally a value irrelative to a pixel value of a surrounding pixel. Particularly, a noise with a small pixel value (noise appearing as a black dot) and a noise with a large pixel value (noise appearing as a white dot) affect normalization processing.

Now, if the input image 101 is a scanned image and the whole image is brighter than the actual image, it is considered that a luminance distribution is directly shifted to a position where pixel values become larger. However, if a black dot noise appears on the input image 101 as indicated with a location A in FIG. 3A, the black dot noise has an adverse effect on image normalization. In FIG. 3B, the whole image is smoothed by executing reduction conversion. If smoothing processing is applied, a pixel with a value irrelevant to a pixel value of a surrounding pixel, such as a white dot noise and a black dot noise, can be reduced.

A maximum luminance value "max" and a minimum luminance value "min" of the reduced image are shown in FIG. 3B. These values serve as a normalization parameter to be acquired by the parameter acquisition unit 104. It is considered that the normalization parameter is close to an ideal maximum luminance value and minimum luminance value of the input image 101 having noise removed therefrom.

In FIG. 3C, among luminance distributions of the input image 101, a pixel with a pixel value larger than the maximum luminance value acquired in FIG. 3B is replaced with the maximum luminance value, and a pixel with a pixel value smaller than the minimum luminance value is replaced with the minimum luminance value. Thus, pixel values of the input image 101 are corrected such that the luminance distribution of the input image 101 is enlarged right and left relative to an average luminance (not shown) of the reduced image. The input image is normalized using the minimum luminance value (min), the maximum luminance value (max), and the average luminance value (not shown) as reference values. In the example illustrated in FIG. 13C, since the maximum luminance value reaches the upper limit of luminance values earlier, the minimum luminance value does not become "0". If it can be recognized that the input image 101 is an image obtained by scanning a document containing many text portions, correction can be executed such that the distribution reaches both the minimum luminance value and the maximum luminance value.

As described above, a reduced image is generated from the input image 101 and a normalization parameter is acquired from the reduced image, thereby allowing an input image to be normalized while an influence of noise is suppressed.

As smoothing processing by the smoothing unit 103A, if not only reduction conversion but also conversion into a smoothed image by a smoothing filter such as a Gaussian filter is executed, a similar effect can be obtained.

Further, normalization may be executed for not only a luminance component but also one element (color component or channel) of a color space.

Now, a feature amount, a feature point, and a local feature amount will be described. When an image is designated as a search query (query image) to search for a similar image, the search is executed by comparing two images (a query image and a stored image). Typically, when image search is executed, a numeral value or a progression, which represents the contents of an image, is calculated as a feature amount for each image. Then, an image the feature amount of which is similar is searched for as a similar image. As a feature amount, a keyword that indicates the contents of an image may also be employed. However, in the present exemplary embodiment, information containing that calculated from at least pixel values of an image, for example, information on color arrangement, is calculated as a feature amount.

In search using information on color arrangement, an image is converted into a reduced image of 8×8 pixels. Then, position information (0, 0) to (8, 8) on each pixel is associated with a numeric value representing a color that appears in each pixel, thereby calculating a feature amount.

However, search using information on color arrangement is unsuitable for partial search. For example, when an image containing a predetermined logo is intended to be searched, it is difficult to effect search when a predetermined logo is contained but a background is different, when a part of a predetermined logo is hidden by an obstacle, or when a predetermined logo is enlarged or reduced.

In such a case, there is a method which uses a local feature contained in a query image. For example, there is a method which selects a point at which the correspondence of two images can easily be established and then finds the correspondence in point between two images. Such a point at which the correspondence of two images can easily be established is referred to as a feature point. The feature point may also be referred to as a key point or an interest point, or may be defined as a corner, which has a sharp edge.

In the present exemplary embodiment, normalization processing when image search using a local feature amount for a feature point is executed. An extraction method for a feature point and a calculation method for a local feature amount in the present exemplary embodiment will be specifically described below.

Figure 4:
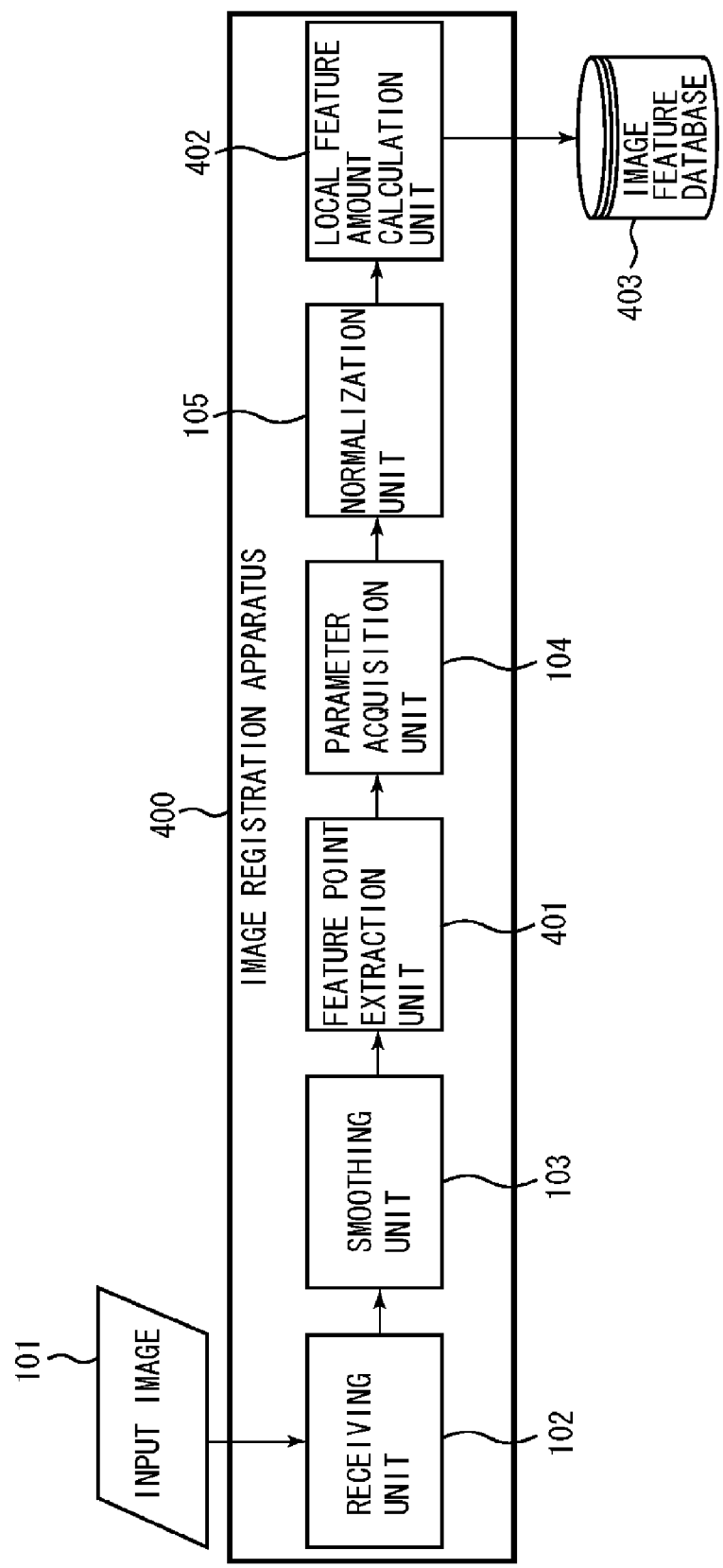
FIG. 4 is a functional block diagram illustrating an image registration apparatus according to an exemplary embodiment of the present invention.

FIG. 4 is a functional block diagram illustrating an image registration apparatus serving as an image processing apparatus according to another exemplary embodiment of the present invention. The image registration apparatus 400 includes the receiving unit 102, the smoothing unit 103, a feature point extraction unit 401, the parameter acquisition unit 104, the normalization unit 105, and a local feature amount calculation unit 402.

Figure 5:
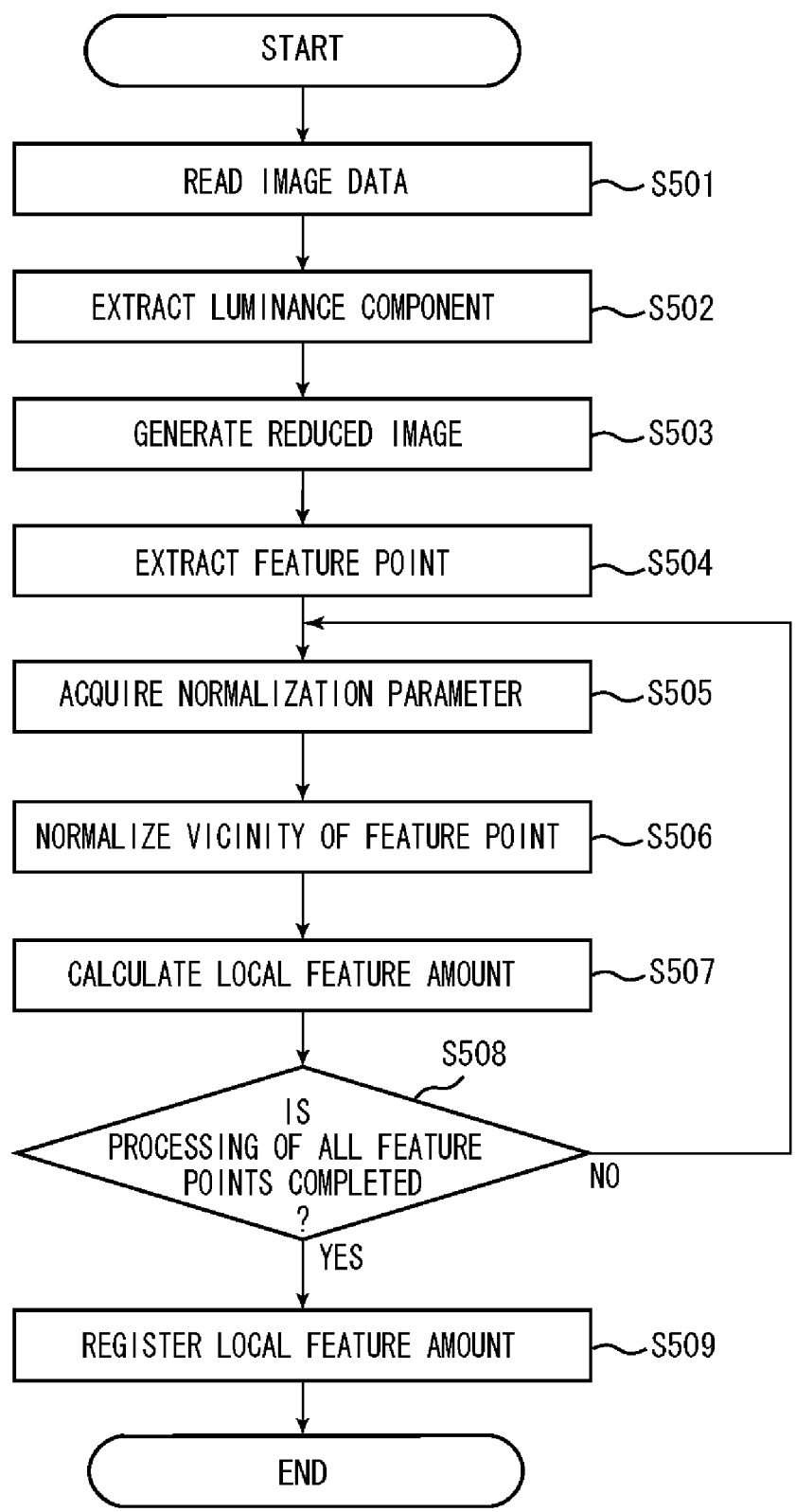
FIG. 5 is a flowchart illustrating image registration processing according to an exemplary embodiment of the present invention.

FIG. 5 is a flowchart illustrating image registration processing by the image registration apparatus 400. Since steps S501 to S502 are similar to steps S201 to S202, description thereof is omitted.

Figure 11:
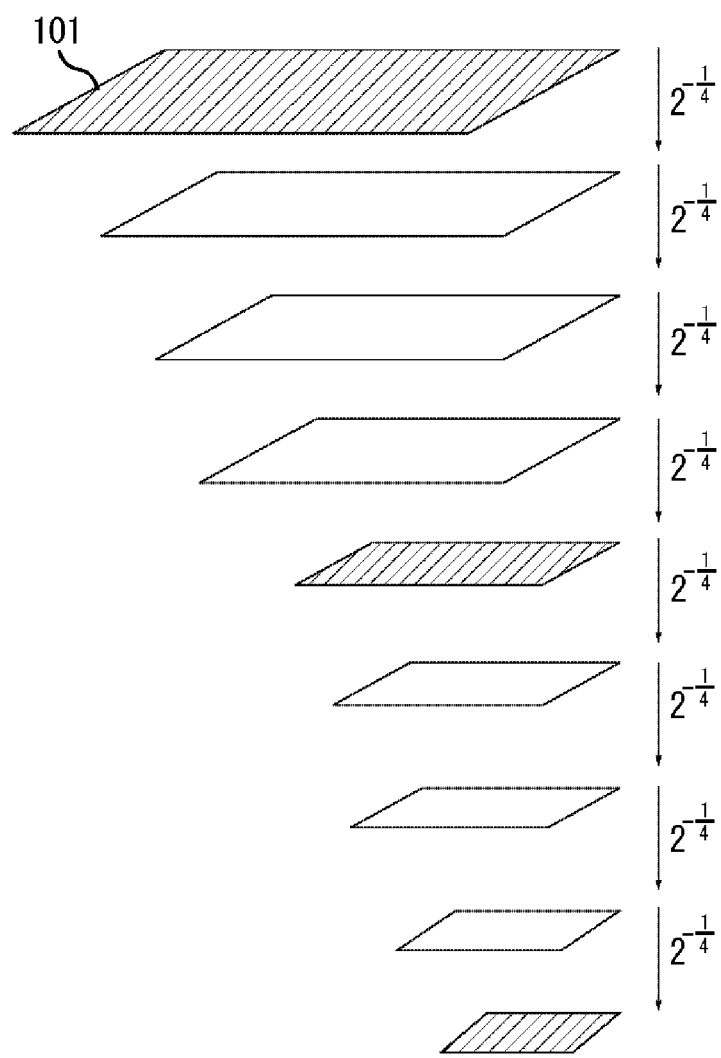
FIG. 11 is a diagram illustrating reduced images having various resolutions.

In step S503, the smoothing unit 103 executes reduction conversion of the input image 101. In this step, for calculation of a local feature amount in step S507, reduced images of n kinds of resolutions (n smoothed images) are generated. Specifically, the smoothing unit 103 executes n-time reduction processing of a luminance component that the receiving unit 102 has acquired according to a reduction rate p (refer to FIG. 11). The reduction rate p and the number n of times of reduction are predetermined. FIG. 11 indicates reduction conversion processing of n=8 and p=$2^{-(1/4)}$. In the present exemplary embodiment, a reduced image of a luminance component is acquired by a linear interpolation method. However, if it is a processing method for executing reduction conversion of an image, other methods may be employed.

In step S504, the feature point extraction unit 401 extracts a feature point from the reduced image and the input image 101.

In the present exemplary embodiment, a Harris operator is used for extracting a candidate of a feature point, thereby extracting a reproducible (robust) feature point to be extracted even if a change in rotation is present in an image. A feature amount to be robustly extracted for a change in rotation means, for example, a feature point to be repeatedly extracted from the same image contents (corner or edge) even if an image is subjected to rotation processing.

First, the feature point extraction unit 401 applies the Harris operator to the input image 101 and the image smoothed by the smoothing unit 103, and acquires a pixel (candidate pixel) with a candidate of a feature point. A method for extracting a corner or an edge such as the Harris operator is known as a corner detector, which may be employed. However, only applying the corner detector may find a low reproducible feature point, which may not be extracted even if the same corner detector is used when there has been a change in image. Further, candidates of a feature point to be extracted extend several hundreds to several thousands, and when the candidates are used for search and recognition, a calculation processing load and a data volume may be enormously increased. Thus, it is possible to reduce the calculation processing load and the data volume of a local feature amount while improving calculation accuracy by concentrating on a high-robustness local feature point.

First, luminance values of a candidate pixel and eight adjacent pixels surrounding the candidate pixel are compared to narrow down to pixels in which the luminance value (pixel value) of the candidate pixel is maximum among nine pixels and also not less than a predetermined value. This narrow-down processing allows removal of points that are small in value and unstable from candidates.

Further, in an image with a candidate pixel, a luminance distribution f(x, y) is transformed into a Laplacian function E(x, y) to calculate a Laplacian value of the candidate pixel. Then, the calculated Laplacian values are compared in a smoothing direction to narrow down to feature points robust also in a change in enlargement and reduction.

In the present exemplary embodiment, equation (1) is used as a Laplacian function.

$$E(x, y) = \left| \frac{\partial^2}{\partial x^2} f(x, y) + \frac{\partial^2}{\partial y^2} f(x, y) \right|. \tag{1}$$

The smoothing direction indicates a direction of the number of times of reduction when multi-stage reduction is executed as shown in FIG. 11. In a reduced image reduced to such a multi stage, attention is focused on a feature point candidate to be extracted from the same image contents (corner or edge). Now, attention is focused on a feature point candidate which has been reduced i times. A Laplacian value E(i) at this point, a Laplacian value E(i+1) of an image which has been reduced (i+1) times, and a Laplacian value E(i−1) of an image which has been reduced (i−1) times are compared to narrow down to a candidate feature point where E(i) is equal to or larger than E(i+1) and E(i−1).

There are various methods as a narrow-down method of a feature point, which can be employed. Further, if an image from which to extract a feature amount is a simple image and a suitable number of candidate feature points having sufficient accuracy can be extracted only with a corner detector, narrow-down processing can also be omitted.

Next, in step S505, the parameter acquisition unit 104 acquires a normalization parameter. In step S506, the normalization unit 105 normalizes a pixel value in the vicinity of the feature point based on the normalization parameter.

In the present exemplary embodiment, the normalization unit 105 normalizes pixel values of a pixel containing the feature point and pixels in the vicinity of the feature point using the normalization parameter that the parameter acquisition unit 104 has acquired from a reduced image high in a smoothing degree.

In the present exemplary embodiment, a maximum value (value of brightest color and white correction value) and a minimum value (value of darkest color and black correction value) of a pixel value of a pixel to be contained in an area for acquiring a parameter as a normalization parameter. Then, normalization processing is executed for a pixel value of each pixel contained in an area for normalization using equation (2):

$$h' = \frac{h - b}{w - b} \tag{2}$$

where h is a pixel value before normalization, h' is a pixel value after normalization, b is a black correction value, w is a white correction value, and each of h, h', b, and w is a value of 0 to 1 (in the first exemplary embodiment, 0 to 255).

As the above-described exemplary embodiment, normalization may be executed for not only a luminance component but also one element of a color space (color component or channel).

In step S507, the local feature amount calculation unit 402 calculates a local feature amount in the feature point extracted by the feature point extraction unit 401. The local feature amount is calculated from a pixel value of a pixel contained in a predetermined area adjacent to a pixel containing a feature point.

In the present exemplary embodiment, a combination of a Local Jet obtained by quantifying a pattern possessed by a feature point and an area in the vicinity of the feature point and its derivative is used as a local feature amount, as represented by equation (3):

$$V(x, y) = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (3)$$

where V(x, y) is a local feature amount concerning a feature point present at coordinates (x, y) in an image.

However, symbols used in the right side of equation (3) are defined by the following equations (4) to (9). G(x, y) in the right side of equation (4) is a Gaussian function, I(x, y) is a pixel value at coordinates (x, y) in an image, and "*" is a symbol which represents convolution operation. Further, equation (5) is a partial derivative for x of a variable L defined in equation (4). Equation (6) is a partial derivative for y of the variable L. Equation (7) is a partial derivative for y of a variable Lx defined in equation (5). Equation (8) is a partial derivative for x of the variable Lx defined in equation (5). Equation (9) is a partial derivative for y of a variable Ly defined in equation (6).

$$L = G(x, y) * I(x, y) \quad (4)$$

$$L_x = \frac{\partial L}{\partial x} \quad (5)$$

$$L_y = \frac{\partial L}{\partial y} \quad (6)$$

$$L_{xy} = \frac{\partial^2 L}{\partial x \partial y} \quad (7)$$

$$L_{xx} = \frac{\partial^2 L}{\partial x^2} \quad (8)$$

$$L_{yy} = \frac{\partial^2 L}{\partial y^2} \quad (9)$$

Since G(x, y) is a Gaussian function, G(x, y) normally has the standard deviation σ as a variable. However, in the present exemplary embodiment, the standard deviation is predetermined as v=ar (a is constant). An area to be referred to when a local feature amount is calculated (area for quantifying a pattern) is a pixel contained in a partial area with a radius r centering on a target feature point. The radius r can be represented by a radius of a circle which circumscribes the edge of an area where weighting by a Gaussian filter is a threshold value ϵ or larger.

If a method can calculate a local feature amount which indicates features of a pixel containing a feature point and pixels in the vicinity of the feature point, a method other than the above-described method may be employed. The above-described local feature amount includes five elements. When search accuracy and robustness of a local feature amount are required, a large number of elements are better. However, the larger the number of elements becomes, the higher the load of calculation becomes. For example, a local feature amount to be determined by a method such as SIFT (element is around 100) and PCA-SIFT (element is around 2000) is high in search accuracy and robustness (indicate small in search omission). However, the load of calculation is increased.

In step S508, it is determined whether calculation processing of a local feature amount is completed. When it is completed, the processing proceeds to step S509. In step S509, the input image 101 or a reduced image is associated with a local feature amount, outputted from the mage registration apparatus 400, and registered with an image feature database 403. Further, it is useful to be associated with information corresponding to coordinates in the input image 101.

Figure 7:
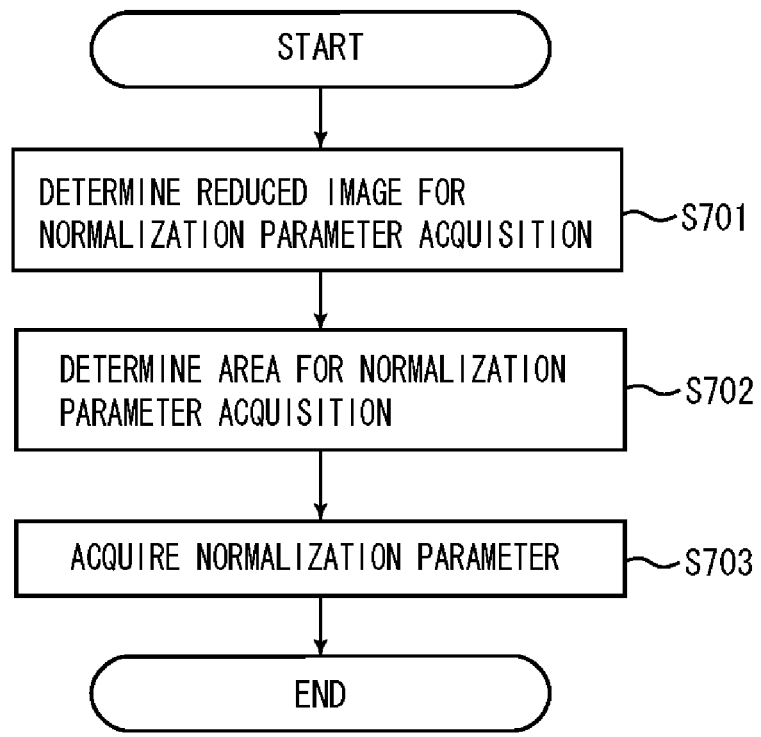
FIG. 7 is a flowchart illustrating acquisition processing for a normalization parameter.

Acquisition of a normalization parameter and normalization will further be described. FIG. 7 is a flowchart illustrating processing by the parameter acquisition unit 104 when a normalization parameter is acquired.

First, in step S701, the parameter acquisition unit 104 determines a reduced image for acquiring a normalization parameter for each feature point extracted by the feature point extraction unit 401.

Next, in step S702, the parameter acquisition unit 104 determines an area for acquiring a normalization parameter for each feature point.

In step S703, the parameter acquisition unit 104 acquires a normalization parameter for each feature point. The acquisition method for a normalization parameter is similar to that in the above-described exemplary embodiment.

If processing for acquiring a normalization parameter for each feature point is overloaded, the same normalization parameter may be employed for each class using clustering that classifies a set of feature points into several classes. The classes can be classified by a degree of smoothing or classified for each close feature point.

Figure 8:
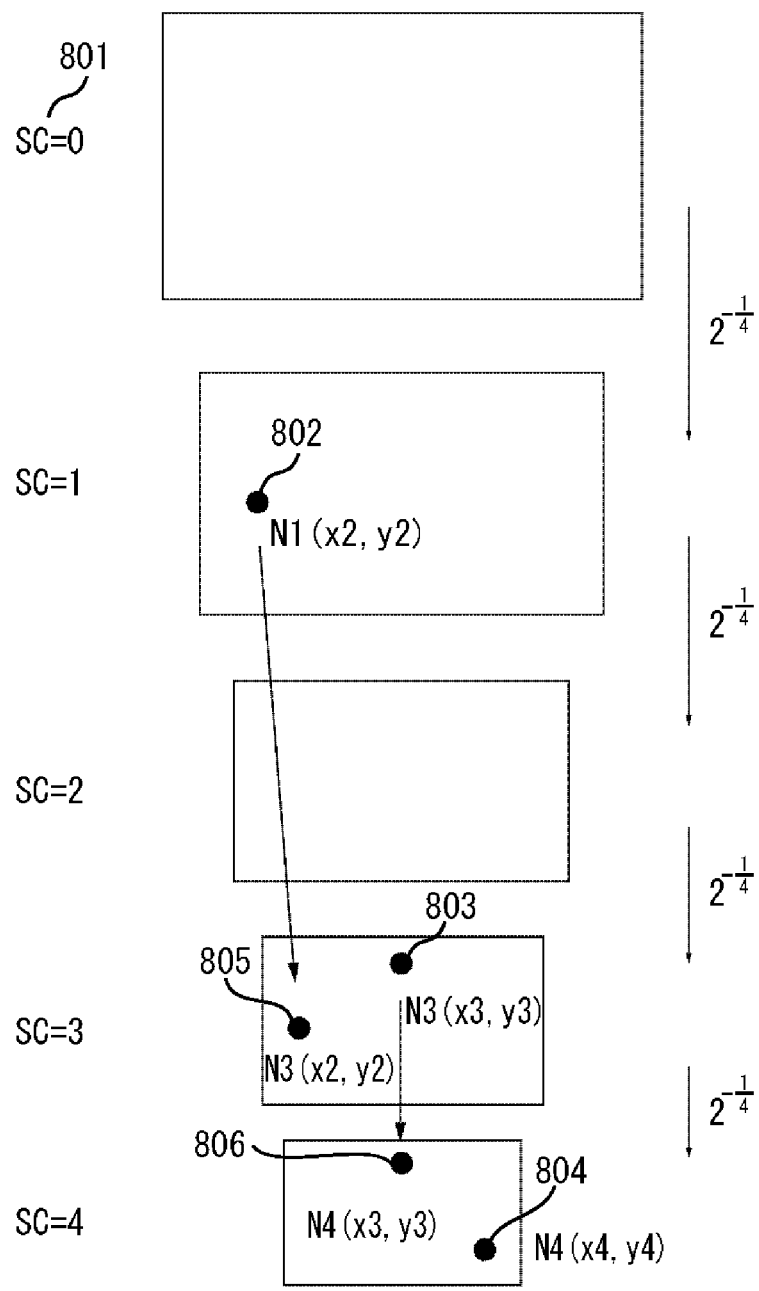
FIG. 8 is a diagram illustrating acquisition processing for a normalization parameter.

FIG. 8 is a diagram obtained by superimposing a feature point extracted by the feature point extraction unit 401 in step S504 on a reduced image generated by the smoothing unit 103 in step S503. Normalization processing of an image with four reduced images each different in resolution generated will be described.

In the input image 101, the number of times of reduction of an image is SC=0. When the number of times of reduction is SC and a reduction rate is p, the size of a reduced image is provided by the (SC) power of p of an input image (image in SC=0). For example, the size of a reduced image when a reduction rate p is $2^{-(1/4)}$ and SC=4 corresponds to an image reduced by 50% relative to the input image 101.

Feature point 802 is one of feature points extracted from a reduced image of SC=1 by the feature point extraction unit 401. The coordinates of the feature point 801 on the reduced image are N1(x2, y2). Feature point 803 is one of feature points extracted from a reduced image of a scale number SC=3 by the feature point extraction unit 401. The coordinates of the feature point 803 on the reduced image are N3(x3, y3). Feature point 804 is one of feature points extracted from a reduced image of a scale number SC=4 by the feature point extraction unit 401. The coordinates of the feature point 804 on the reduced image are N4(x4, y4).

Feature point 805 is a point that conforms thereto when the feature point 802 extracted from a reduced image of SC=1 is converted into a coordinate system of a reduced image of a scale number SC=3. The coordinates of the feature point 805 are N3(x2, y2). Feature point 806 is a point that conforms thereto when the feature point 803 extracted from a reduced image of SC=3 is converted into a coordinate system of a reduced image of SC=4. The coordinates of the feature point 806 are N4(x3, y3).

Processing for acquiring a normalization parameter using an image further reduced by two times compared with an image extracted with a feature point for normalization to calculate a local feature amount will be described with reference to FIG. 8. In feature point 803, a reduced image reduced two times from a reduced image of a reduction level SC=3 extracted with feature point 803 is not present. Thus, a normalization parameter for feature point 803 is acquired using a reduced image of SC=4. In feature point 804, since a reduced image reduced more than that of a reduction level SC=4 extracted with feature point 804 is not present, a normalization parameter is acquired using a reduced image of SC=4.

Alternately, as a reduced image for acquiring a normalization parameter, a reduced image with a largest number of times of reduction among reduced images to be extracted with a corresponding feature point may be employed.

Next, in step S702, an area to be referred to when the parameter acquisition unit 104 acquires a normalization parameter is determined.

Figure 9:
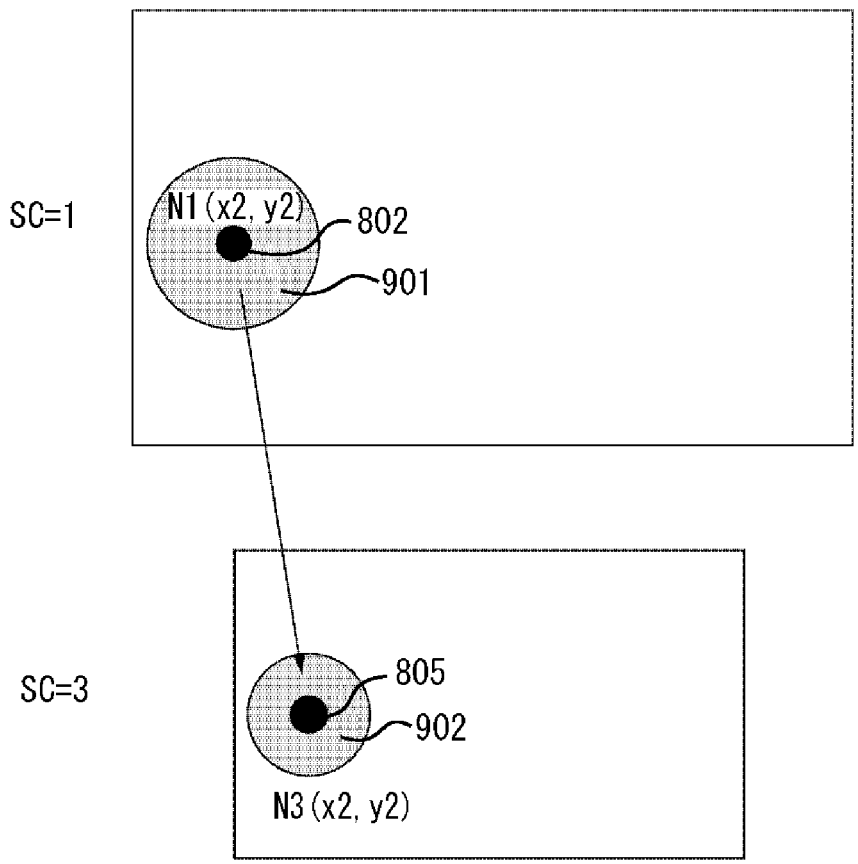
FIG. 9 is a diagram illustrating the detail of acquisition processing for a normalization parameter.

FIG. 9 is a diagram illustrating an area to be referred to when a normalization parameter is acquired from feature point 802 extracted by the feature point extraction unit 401 in step S304. In the present exemplary embodiment, when a normalization parameter is acquired, a pixel contained in a circular area centering on a feature point is referred to. This is intended to reduce a fluctuation amount when a change in rotation is provided.

Area 901 is a circular area of a radius r1 (not shown) centering on feature point 802. The radius r1 is determined by a predetermined value. Area 902 is a circular area of a radius r2 centering on feature point 805. The radius r2 is a size subjected to two-time reduction of the radius r1 by a reduction rate p.

Next, in step S703, the parameter acquisition unit 104 acquires a normalization parameter from a pixel contained in an area centering on a feature point. First, a white correction value for correcting a white dot and a black correction value for correcting a black dot are determined based on a pixel value (luminance value) of a pixel contained in an area determined in step S702.

When an area for acquiring a normalization parameter and an area for normalization are a corresponding area (areas 901 and 902 in FIG. 9) in coordinate conversion, a suitable normalization parameter can be acquired. This is because a portion which is not contained in an image of an area for normalization among images of an area for acquiring a normalization parameter may reduce accuracy of normalization. However, when processing for determining an area for acquiring a normalization parameter is overloaded, it is also considered to acquire a normalization parameter from the entire smoothed image.

Further, an area for normalization can circumscribe or conform to an area for calculating a local feature amount. When the area for normalization is smaller than the area for calculating a local feature amount, a local feature amount can be calculated from a mixed area of a normalized area and a non-normalized area. Thus, the area for normalization can contain the area for calculating a local feature amount. However, the area for normalization and the area for calculating a local feature amount focus attention on a predetermined feature point, and centers thereof are the same. Thus, a non-normalized area is a pixel far in distance from a feature point among areas for calculating a local feature amount. When a local feature amount is calculated, since a weighing average is performed in which a pixel value of a pixel close to a feature point is provided with higher weight by convoluting a Gaussian function as described above, an influence of a pixel in the non-normalized area is reduced.

On the other hand, when the area for normalization is larger than the area for calculating a local feature amount, a portion that is used to execute normalization but is irrelevant to calculation of a local feature amount simply increases a calculation cost.

Depending on the kinds of a local feature amount, the area for calculating a local feature amount may also be a square area centering on a feature point (PCA-SIFT).

In the present exemplary embodiment, when a normalization parameter is acquired from a reduced image high in reduction rate, an influence of a halftone dot noise or an isolated dot noise can be reduced. On the other hand, since normalization can be executed while keeping localization of a local feature amount, an accurate local feature amount can be calculated.

Similarly, when a local feature amount is determined, also when the number of times of use of a Gaussian filter is used as the size of a calculation area for a feature amount, it is useful to use a Gaussian filter in the smoothing unit 103 to generate a plurality of smoothed images.

As in the present exemplary embodiment, when an image group of multiple resolution, which is used in concentration on a feature point, and an image group of multiple resolution, which is used when normalization is executed and a local feature amount is determined, conform to each other, processing can simply be reduced.

Figure 12:
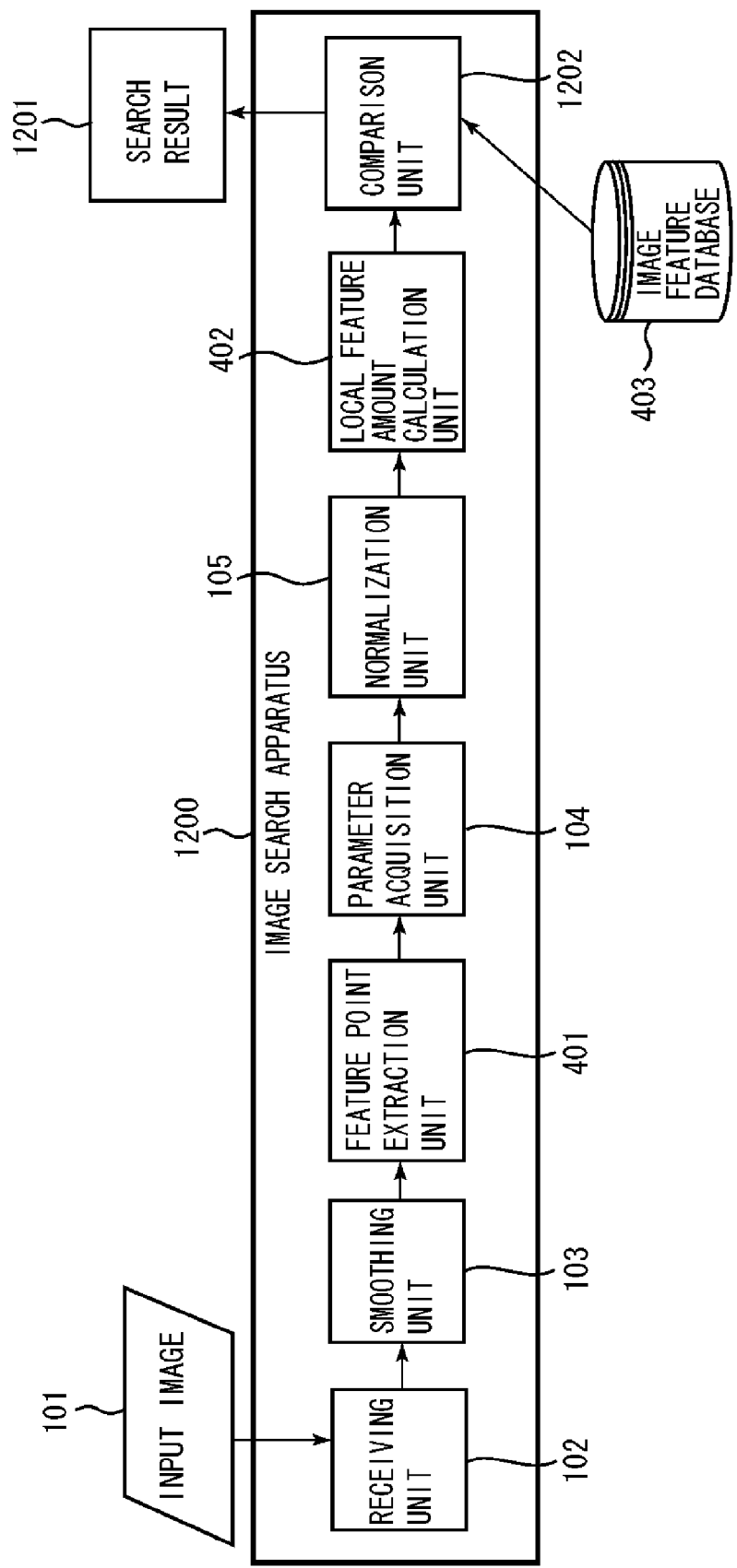
FIG. 12 is a functional block diagram illustrating an image search apparatus according to an exemplary embodiment of the present invention.

FIG. 12 is a functional block diagram illustrating an image search apparatus serving as an image processing apparatus according to a yet another exemplary embodiment of the present invention. The image search apparatus 1200 includes the receiving unit 102, the smoothing unit 103, the feature point extraction unit 401, the parameter acquisition unit 104, the normalization unit 105, the local feature amount calculation unit 402, and a comparison unit 1202.

Figure 13:
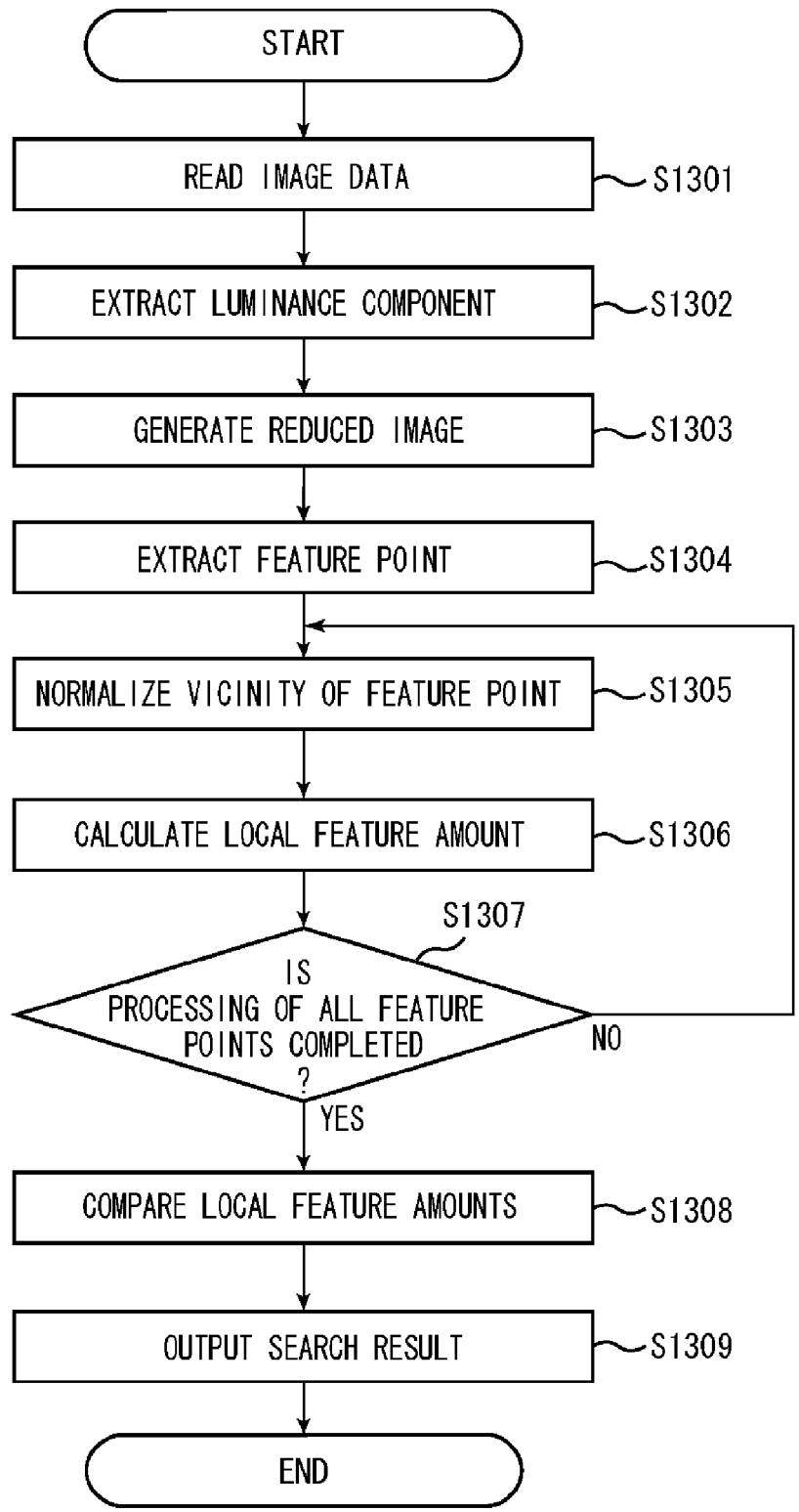
FIG. 13 is a flowchart illustrating image search processing according to an exemplary embodiment of the present invention.

FIG. 13 is a flowchart illustrating image search processing by the image search apparatus 1200. Since steps S1301 to S1307 are similar to processing in steps S501 to S507 (FIG. 5) in the second exemplary embodiment, description thereof is omitted.

In step S1308, the comparison unit 1202 compares a local feature amount calculated by the local feature amount calculation unit 402 and a local feature amount acquired from the image feature database 403. This comparison processing is executed for each image registered with the image feature database 403 and calculates similarity to the input image 101 as a comparison result. The detail of a similarity calculation method will be described later.

Next, in step S1309, the comparison unit 1202 associates the calculated similarity with an image (an image in the image feature database 403) provided by the original calculating the similarity. Then, the comparison unit 1202 outputs a list of images in order of high similarity as a search result 1201.

In order to describe the similarity calculation method, first, a comparison method of a local feature amount will be described. A local feature amount shown in local feature amount equation (3) is indicated by a progression with five elements. However, even if an element is only one, accuracy is decreased but search can be executed. Since a progression with a plurality of elements or more is a vector of a multidimensional space, similarity can be determined by comparing two vectors. For example, in the present exemplary embodiment, it is addressed such that the smaller the absolute value of a vector of a difference between two vectors to be compared becomes, the higher the similarity becomes. However, it may be provided such that the smaller the angle between two vectors becomes, the higher the similarity becomes. These may also be complexly addressed.

Next, a corresponding point will be described. Now, an image A and an image B which contains an image A' that an image is rotated by a predetermined angle around a center point of an image shall be present. Then, a local feature amount calculated from each feature point of the image A and a local feature amount calculated from each feature point of the image B are compared. Each point extracted from the same image contents (edge and corner) is selected as a corresponding point. At this time, in order to search for a corresponding point, a local feature amount is compared to execute processing for selecting each most similar point as a corresponding point. However, an erroneous corresponding point may be contained among corresponding points selected like this. For example, the image A must include a corresponding point only in the image A' in the image B. However, it may be processed such that a corresponding point is also present outside the image A'. Basically, as a corresponding point is increased, search is executed as a similar image. Thus, such an erroneous corresponding point decreases search and recognition accuracy of an image.

For example, all coordinates of a correctly corresponding feature point of the image A and the image B can be represented by the same transformation matrix. However, the erroneous corresponding point is provided by a different transformation matrix. Thus, processing for calculating similarity while an erroneous corresponding point is removed is required.

In the present exemplary embodiment, the similarity calculation method employing Random Sample Consensus (RANSAC) will be described. The comparison unit 1202 randomly selects a corresponding candidate of a feature point of one by one from each of two images to be compared. Then, the comparison unit 1202 evaluates validity of its correspondence from the corresponding candidate of the remaining feature point to calculate an evaluation value. The comparison unit 1202 repeats this by a predetermined number of times and subjects a value with most excellent evaluation to similarity of two images.

First, the comparison unit 1202 denotes local feature amounts calculated by the local feature amount calculation unit 402 as Vq1 to Vqn. Then, the comparison unit 1202 denotes coordinates of feature points Q1 to Qn associated with local feature amounts Vq1 to Vqn as Q1(x1', y1'), . . . , Qn(xn', yn'). On the other hand, the comparison unit 1202 denote local feature amounts associated with an image to be registered with the image feature database 403 as Vs1 to Vsm, and denotes coordinates of feature points S1 to Sm associated with local feature amounts Vs1 to Vsm as S1(x1, y1), . . . , Sm(xm, ym).

Figure 6:
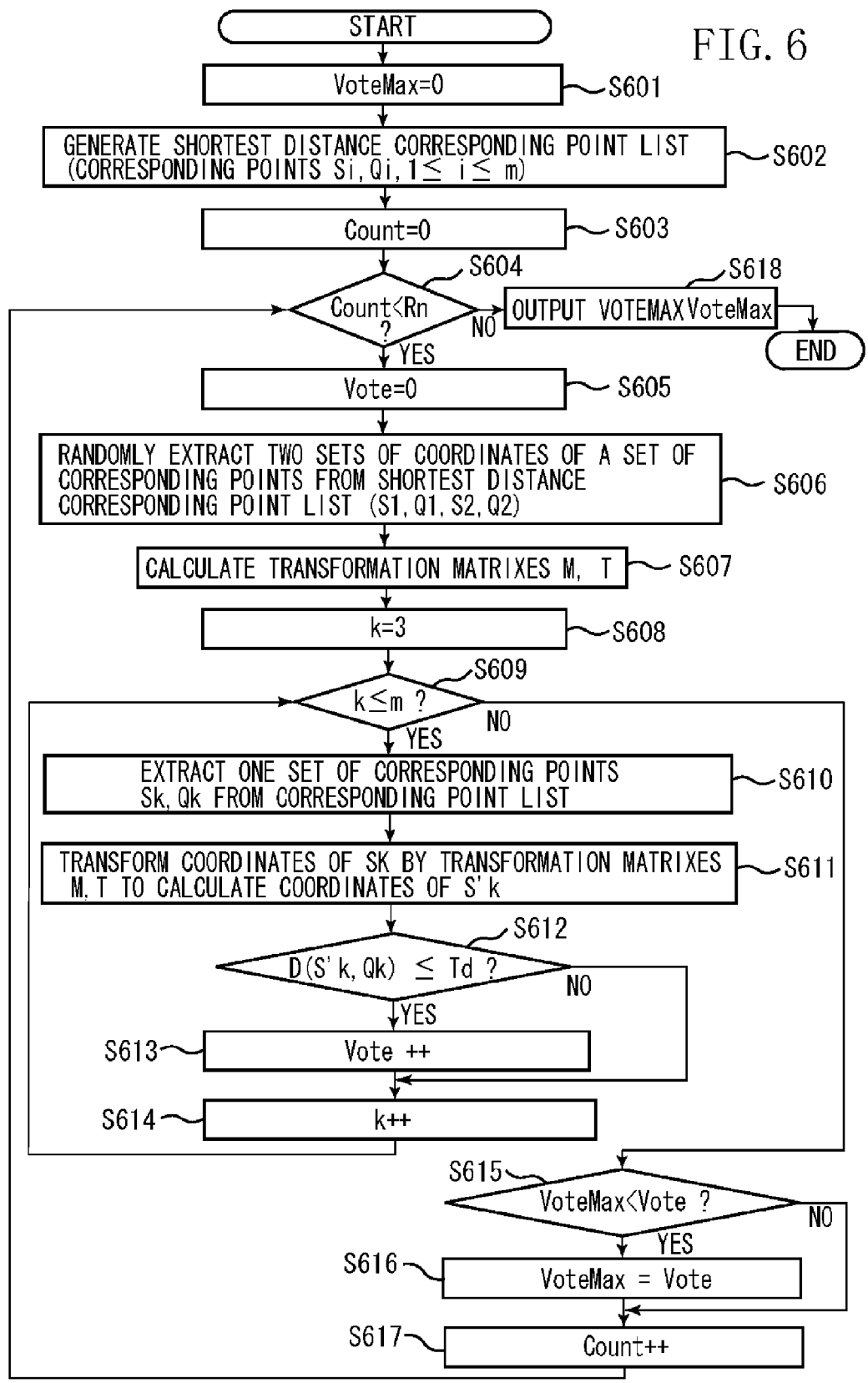
FIG. 6 is a flowchart illustrating processing for selecting a corresponding point.

FIG. 6 is a flowchart illustrating a calculation procedure of similarity. First, in step S601, the comparison unit 1202 initializes a variable VoteMax, which represents a final vote number. Next, in step S602, the comparison unit 1202 calculates a difference between one of n local feature amounts Vq1 to Vqn and one of m local feature amounts Vs for all combinations. More particularly, the comparison unit 1202 extracts a combination (corresponding point) such that a difference in local feature amount is provided by a threshold value Tv or smaller and also a minimum difference is provided in each point of Q1 to Qn, and generates a list as a corresponding point list.

Hereafter, with respect to the k-th corresponding point registered with a corresponding point list, each of the local feature amount of the corresponding point is described as Vq(k) and Vs(k). Further, each of the feature point associated with Vq(k) and Vs(k) is described as Qk and Sk, and coordinates thereof is described as Qk(x'k, y'k) and Sk(xk, yk). Further, a set number of corresponding points registered with the corresponding point list generated in Step S602 is denoted as m.

Next, in step S603, the comparison unit 1202 initializes a variable Count, which represents the repeat count number of similarity calculation processing, into zero. In step S604, the comparison unit 1202 determines whether the repeat count number Count does not exceed a predetermined maximum repeat processing number of times Rn. If the repeat count number Count exceeds the predetermined maximum repeat processing number of times Rn, the processing proceeds to step S618. In step S618, the comparison unit 1202 outputs the final vote number VoteMax, and then the processing ends.

Further, in step S604, if the repeat count number Count does not exceed the maximum repeat processing number of times Rn, the processing proceeds to step S605. In step S605, the comparison unit 1202 initializes a variable Vote, which represents a vote number, into zero. Next, in step s606, the comparison unit 1202 randomly extracts two sets of coordinates of a set of corresponding points from the shortest distance corresponding point list. These coordinates are described as Q1(x'1, y'1) and S1(x1, y1), and Q2(x'2, y'2) and S2(x2, y2). In step S607, on the assumption that extracted Q1(x'1, y'1) and S1(x1, y1), and Q2(x'2, y'2) and S2(x2, y2) satisfy transformation shown in equation (10), the comparison unit 1202 determines variables a to f in equation (10).

However, in step S607 shown in FIG. 6, a matrix including variables a to d is represented by M, and a matrix including variables e to f is represented by T.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (10)$$

In the present exemplary embodiment, for simplicity, only similarity transformation is considered. At this time, the above-described equation (10) is rewritten as the following equation (11):

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (11)$$

At this time, variables a, b, e, and f are represented by equation (12) to equation (15) using x'1, y'1, x1, y1, x'2, y'2, x2, and y2.

$$a = \frac{(x_1 - x_2)(x'_1 - x'_2) + (y_1 - y_2)(y'_1 - y'_2)}{(x_1 - x_2)^2 + (y_1 - y_2)^2} \quad (12)$$

$$b = \frac{(x_1 - x_2)(y'_1 - y'_2) - (y_1 - y_2)(x'_1 - x'_2)}{(x_1 - x_2)^2 + (y_1 - y_2)^2} \quad (13)$$

$$e = \frac{(y'_1 - y'_2)(x_1 y_2 - x_2 y_1) - (x'_1 + x'_2)(x_1 x_2 + y_1 y_2) +}{x'_1(x_2^2 + y_2^2) + x'_2(x_1^2 + y_1^2)} \quad (14)$$

$$f = \frac{(x'_1 - x'_2)(y_1 x_2 - y_2 x_1) - (y'_1 + y'_2)(y_1 y_2 + x_1 x_2) + \\ y'_1(y_2^2 + x_2^2) + y'_2(y_1^2 + x_1^2)}{(x_1 - x_2)^2 + (y_1 - y_2)^2} \qquad (15)$$

Next, in step S608, the comparison unit 1202 initializes a corresponding point selection variable k into 3, in order to select a point other than two sets of points randomly extracted from the corresponding point list in step S605. Then, in step S609, the comparison unit 1202 determines whether the corresponding point selection variable k exceeds a set number m of corresponding points registered with the corresponding point list. If the corresponding point selection variable k exceeds the set number m of corresponding points, the processing proceeds to step S615. This will be described below. In determination in step S609, when the corresponding point selection variable k does not exceed the set number m of corresponding points registered with the corresponding point list, the processing proceeds to step S610.

In step S610, the comparison unit 1202 extracts a point other than two sets of points S1(x1, y1) and S2(x2, y2) randomly extracted from the corresponding point list in step S605 from the corresponding point list. In the present exemplary embodiment, the extracted point is described as Sk(xk, yk).

Next, in step S611, the comparison unit 1202 determines coordinate Sk'(x'k, y'k) obtained by transforming Sk(xk, yk) using equation (11).

Thereafter, in step S612, the comparison unit 1202 calculates a geometrical distance between the coordinates Sk'(x'k, y'k) and the coordinates Qk(x'k, y'k) by a Euclidean distance. The comparison unit 1202 determines whether the Euclidean distance is not larger than a threshold value Td. When the Euclidean distance is the threshold value Td or smaller, the processing proceeds to step S613. In step S613, the comparison unit 1202 increments a vote number Vote, and the processing then proceeds to step S614. Further, when the Euclidean distance is larger than the threshold value Td, the processing proceeds to step S614.

In step S614, the comparison unit 1202 increments the corresponding point selection variable k, and the processing then returns to step S609. The comparison unit 1202 repeats the above-described processing until the corresponding point selection variable k exceeds the set number m of corresponding points registered with the corresponding point list.

Next, processing when the corresponding point selection variable k exceeds the set number m of corresponding points registered with the corresponding point list in step S609 will be described in step S615. In step S615, the comparison unit 1202 compares the value of the vote number Vote and the value of the final vote number VoteMax. When the value of the vote number Vote is larger than the value of the final vote number VoteMax, the processing proceeds to step S616.

In step S616, the comparison unit 1202 replaces the value of the final vote number VoteMax with the value of the vote number Vote. Then, in step S617, the comparison unit 1202 increments the repeat count number Count. The processing then returns to step S604.

Further, in step S615, when the value of the vote number Vote is not larger than the value of the final vote number VoteMax, the processing proceeds to step S617. In step S617, the comparison unit 1202 increments the repeat count number Count. The processing then returns to step S604.

The similarity calculation method in the present exemplary embodiment has been described by considering only similarity transformation. However, the similarity calculation method can correspond to other geometrical transformation such as affine transformation by determining a transformation matrix corresponding to each request in step S607. For example, in affine transformation, first in step S606, the comparison unit 1202 subjects the coordinate number of a set of corresponding points to be randomly selected to 3. Next, in step S607, the comparison unit 1202 uses not equation (11) but equation (10). Thus, variables a to f may be determined using three sets of corresponding points (total six points) selected in step S606.

Further, in the similarity calculation method in the present exemplary embodiment, in step S618, a method has been described which outputs the final vote number VoteMax as similarity. However, the present invention is not limited to this. Other similarity may be calculated. Processing after step S603 is not executed to output the set number m of corresponding points registered with the corresponding point list generated in step S602 as similarity. Thus, a search speed can be increased while fixed search accuracy is maintained.

As apparent from the above-described description, the image search apparatus in the present exemplary embodiment corrects a pixel value of an area for extracting a feature point using a normalization parameter (minimum value or maximum value of pixel value) extracted from a smoothed image (reduced image), thereby executing normalization of an image.

Accordingly, the image search apparatus can be applied to an image search and recognition technique using a local feature amount resistant to a decline in image quality and a change in color. For example, the image search apparatus includes a search system, a feature point matching system, a stereo matching system, a recognition system, and a codec system.

In the above-described exemplary embodiment, a white correction value and a black correction value are replaced, thereby executing normalization. However, a histogram of a luminance value may be generated to execute processing for smoothing the histogram.

Figure 10A:
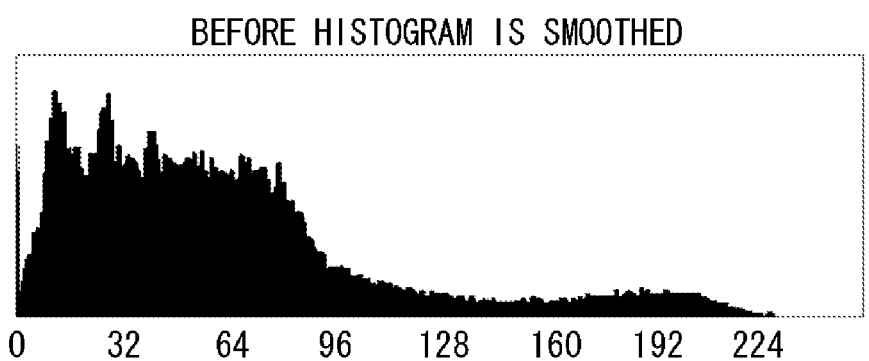
FIGS. 10A to 10C are diagrams illustrating smoothing of a histogram.
Figure 10B:
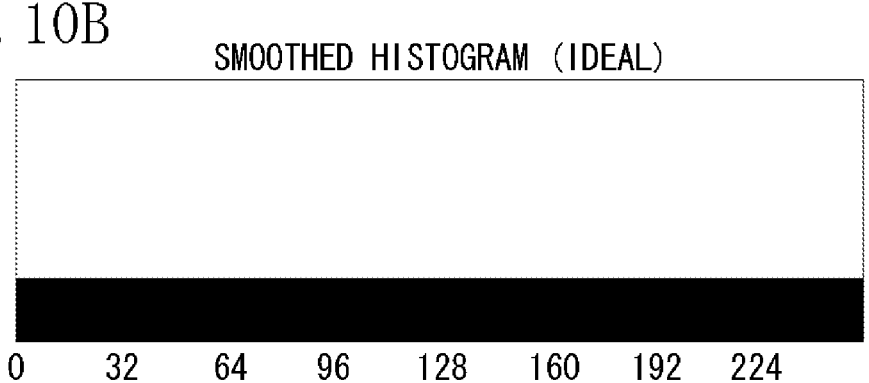
Figure 10C:
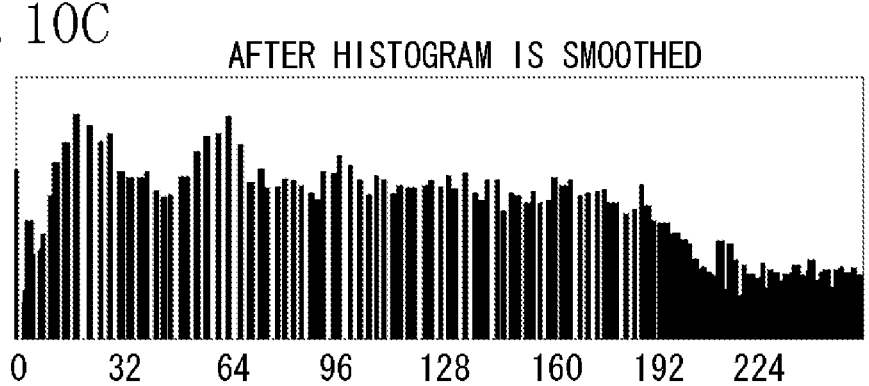

FIG. 10A illustrates a histogram before smoothing. FIG. 10B illustrates an ideal histogram. FIG. 10C illustrates a histogram of a luminance value after smoothing processing.

In the above-described exemplary embodiment, when an image is normalized, a luminance value is used as a pixel value. However, the present invention is not limited to this method. A dynamic range (ratio of minimum value to maximum value) of each channel in a color space of an image may be corrected using a value of each channel in a color image. For example, when the color space is an RGB color space, each value of R, G, and B may be employed. When the color space is an L*a*b* color space, a value of each element of L*, a*, and b* may be employed.

In the above-described exemplary embodiment, a raster image, which is defined by a set of pixels, is used. However, also in a vector image obtained by quantifying changing of a color, the present invention can be applied.

The present invention may be realized by supplying a storage medium storing a program for causing a computer to implement a function of the above-described exemplary embodiment. Further, the present invention may be implemented by executing processing of the above-described exemplary embodiment with a plurality of kinds of hardware and software cooperated.

Figure 14:
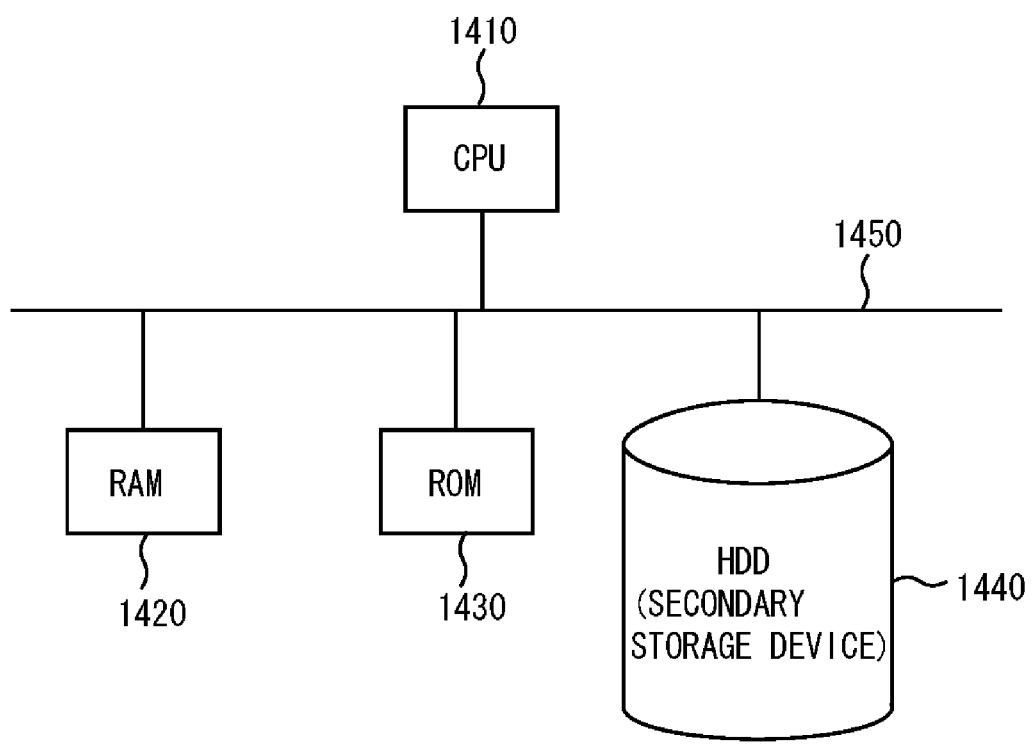
FIG. 14 is a block diagram illustrating a hardware configuration of a system or an apparatus according to an exemplary embodiment of the present invention.

For example, as illustrated in FIG. 14, a program for causing a central processing unit (CPU) 1410 to execute processing of a flowchart in the above-described exemplary embodiment is stored in a read-only memory (ROM) 1430. Then, when the program is run, a program in the ROM 1430 is read into a random access memory (RAM) 1420 to allow the CPU 1410 to execute processing. A bus 1450 is used to transfer data on the ROM 1430, the RAM 1420, the CPU 1410, and a hard disk drive (HDD) 1440.

A computer-readable storage medium can include, for example, a floppy disk, a hard disk, an optical disk, a magneto-optical disk, a compact disc read only memory (CD-ROM), a compact disc-recordable (CD-R), a magnetic tape, a nonvolatile memory card, a read only memory (ROM), and others.

Further, a CPU may read program code for causing the CPU to execute the above-described processing using a function of an operating system (OS) running on a computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This Application claims priority from Japanese Patent Application No. 2008-226990 filed Sep. 4, 2008, which is hereby incorporated by reference herein in its entirety.

What is claimed is:

1. An image processing apparatus comprising;
a receiving unit configured to receive an input image;
a reduction unit configured to execute reduction processing of the input image to generate a plurality of reduced images that are reduced with respective different reduction degrees;
an extraction unit configured to extract a feature point from the input image and the reduced image;
a parameter acquisition unit configured to acquire a normalization parameter from an image higher in reduction degree than an image from which the feature point is extracted; and
a normalization unit configured to normalize pixel values of an area containing an area for calculating a local feature amount concerning the feature point based on the normalization parameter,
wherein an area to be normalized is an area in an image conforming to the feature point from which the extraction unit extracts the feature point.

2. The image processing apparatus according to claim 1, wherein the extraction unit extracts a plurality of feature points from the input image and the reduced image,
wherein the parameter acquisition unit acquires a normalization parameter for each feature point, and
wherein the normalization unit normalizes pixel values of an area containing an area for calculating a local feature amount concerning the feature point for each feature point.

3. The image processing apparatus according to claim 1, further comprising:
a calculation unit configured to calculate a local feature amount concerning the extracted feature point using the pixel values normalized by the normalization unit.

4. The image processing apparatus according to claim 3, further comprising:
a storage unit configure to store the local feature amount calculated by the calculation unit and information specifying an image from which the local feature amount is extracted while associating the local feature amount and the information with each other; and
a comparison unit configured to compare a local feature amount calculated from the input image and the local feature amount stored by the storage unit.

5. The image processing apparatus according to claim 4, wherein the comparison unit compares the input image and an image stored by the storage unit to calculate similarity between the input image and the image stored by the storage unit, to search for an image similar to the input image from among images stored by the storage unit.

6. The image processing apparatus according to claim 1, wherein the normalization unit normalizes pixels contained in a circular area centering on the feature point.

7. The image processing apparatus according to claim 1, wherein the reduction unit executes reduction conversion of the input image and acquires a reduced image.

8. The image processing apparatus according to claim 1, wherein the reduction unit acquires a reduced image by applying a reduction filter to the input image.

9. The image processing apparatus according to claim 1, wherein the parameter acquisition unit acquires the normalization parameter from pixels contained in an area corresponding to an area for calculating a local feature amount concerning the feature point of an image for acquiring the normalization parameter.

10. The image processing apparatus according to claim 1, wherein the pixel value is a luminance value,
wherein the parameter acquisition unit acquires a reference value of a luminance value as the normalization parameter, and
wherein the normalization unit corrects a luminance value of a pixel for normalization based on the reference value.

11. The image processing apparatus according to claim 1, wherein the pixel value is a numeral value concerning a color component of a color space,
wherein the parameter acquisition unit acquires a reference value of at least one channel as the normalization parameter, and
wherein the normalization unit corrects a numeral value concerning a color component of a color space of a pixel for normalization based on the reference value.

12. The image processing apparatus according to claim 1, wherein the normalization unit smoothes a histogram of a pixel value of a pixel for normalization.

13. The image processing apparatus according to claim 1, wherein the parameter acquisition unit acquires a normalization parameter from an image, from which a feature point is extracted at a position corresponding to a position of the feature point of the image from which the normalization parameter is acquired in a converted coordinate, and which is higher in smoothing degree than the image from which the feature point is extracted.

* * * * *